Patented June 10, 1952

2,599,570

UNITED STATES PATENT OFFICE 2,599,570

MOLDING COMPOSITION SUITABLE FOR PHONOGRAPH RECORDS COMPRISING TOUGH POLYVINYL ACETAL RESIN AND PETROLEUM-HYDROCARBON INSOLUBLE RESINOUS WOOD EXTRACT

George F. Metz, Diamond Point, N. Y., assignor to Shawinigan Products Corp., New York, N. Y., a corporation of New York No Drawing. Application April 30, 1945, Serial No. 591,233

14 Claims. (Cl. 260—23)

The present invention relates to molding compositions prepared from hard, horny and tough resins of relatively high molecular weight, and more particularly to molding compositions containing such resins together with a flux and other components and suitable for use in the manufacture of molded articles generally, but especially suited for the manufacture of sound reproducing records, including transcription records, and to a method of compounding said compositions.

It is the general object of the invention to provide improved molding compositions having desirable molding qualities and characterized, even when formed into thin sound reproducing discs, by a high degree of flow while yet possessing great strength, by a relatively high softening point, by an unusual degree of form stability and freedom from warping, and by a high degree of hardness, durability and resistance to moisture and other deteriorating influences.

The lower molecular weight polyvinyl acetal resins can be used, as is known, as the sole binder in molding compositions or can be easily converted into molding compositions with minor quantities of fluxes. There is, however, a group of exceptionally hard, horny and tough resins of relatively high molecular weight which, so far as I am aware, have never been employed in molding compositions because of their poor plasticity and flow properties under the molding conditions usually employed, for example, in the manufacture of phonograph records, and have consequently been limited to other uses, such as for producing tough films and coatings, usually from solutions of the resins. For convenience, these resins will hereinafter be referred to as "refractory resins."

The high molecular weight polyvinyl acetal resins utilized in the present invention are of the type described in the patent to Morrison et al., Reissue No. 20,430, and may be prepared by hydrolyzing a high viscosity polyvinyl ester resin or gum, such as a polyvinyl acetate resin, of high molecular weight, that is, of high viscosity, with a hydrolyzing agent, such as a strong mineral acid like sulfuric, until the resin is hydrolyzed to a high degree, followed by reaction with an aldehyde (which may be present during the hydrolysis or added subsequently thereto). Thus a commercial product known as polyvinyl acetate and sold under the trade name "Gelva" and prepared by polymerizing vinyl acetate, can be hydrolyzed to various degrees and reacted with different aldehydes, such as formaldehyde, acetaldehyde, butyraldehyde, benzaldehyde, etc., and mixtures of aldehydes, to form resinous products certain of which are known as polyvinyl formal, polyvinyl acetal, polyvinyl butyral, and polyvinyl benzal, and are presently sold under the trade-marks "Formvar," "Alvar," "Butvar" and "Benvar," respectively. These polyvinyl acetal resins are prepared from polyvinyl acetates of different viscosities, and the present invention is concerned with the higher molecular weight resins prepared from the higher viscosity polyvinyl acetates, which will be described more specifically hereinbelow.

It is accordingly a further object of the invention to provide a molding composition containing the reaction product of a highly hydrolyzed polyvinyl ester and an aldehyde together with suitable softening, extending, plasticizing, lubricating and, if desired, filling agents and compounded with a sufficient amount of a flux so that the composition is characterized by free flowing properties at the usual temperatures and pressures used in various commercial molding procedures, and by freedom from warping even in the form of relatively thin discs.

It is a further object of the invention to provide a molding material for the manufacture of sound recordings, including transcription records for radio broadcasting stations, and having an unusually high fidelity of tone and which in particular are substantially free from scratch and other surface noises and are characterized also by high surface hardness, great strength and resistance to wear.

It is also an object of the invention to provide a polyvinyl acetal resin-containing molding composition at a sufficiently low cost to enable the same to be used in the manufacture also of the cheaper commercial phonogroph records.

It is a still further object of the invention to provide a resinous molding composition suitable for the manufacture of phonograph records containing a refractory resin of the type above indicated and characterized by satisfactory molding properties at the usual molding temperatures for such products, and particularly good flow properties at such temperatures, and having a low shrinkage on cooling, while being at the same time practically completely free from cold flow and warping at the usual room temperatures, and possessing high tensile strength.

Still another object of the invention is to provide an improved composition containing fluxes and other components capable of converting a refractory polyvinyl acetal resin into a uniform molding composition having the properties above referred to.

More specifically, it is an object of my invention to produce low cost molding compositions by blending such refractory resins with relatively large proportions of a fluxing resin or resins, of which one is an oxidized abietic acid-containing petroleum hydrocarbon-insoluble, aromatic hydrocarbon-soluble resinous pinewood extract, such as that obtained from the wood of the Southern long-leaf pine by separation from the rosin component and the volatile components of an extract of the pine stumps and marketed under the name "Vinsol," which may be used together with other fluxing resins such as cumarone resins, yacca, and the like.

The manner in which these and other objects, whose nature will appear as the description proceeds, are attained will be set out fully in the following, and the features of novelty will be defined in the appended claims.

I have found that a low cost molding composition characterized by an unusual combination of desirable properties from the standpoint of hot flow (molding qualities) and cold flow (form stability), and possessing substantial freedom from warping, high tensile and impact strength, and freedom from surface noises (in the form of a sound record), together with outstanding fidelity of sound reproduction and high resistance to wear, can be obtained by employing as a base a homogeneous mixture of a tough, horny, high molecular weight polyvinyl acetal resin and Vinsol, which acts as a fluxing material. The tough, high molecular weight polyvinyl acetal resins are difficult to compound because of their refractory nature, and are in particular difficult to blend uniformly, even at elevated temperatures, with a relatively low melting flux like Vinsol. In fact, the high molecular weight polyvinyl formal resins cannot be blended with fused Vinsol by the usual heated mixing rolls employed in the resin compounding art for mixing the various components of a molding composition. Thus I have found that when high molecular weight polyvinyl formal and Vinsol are subjected to the action of the conventional compounding rolls or mills at a temperature up to about 360° F., treatment for as much as half an hour fails to effect blending of the polyvinyl formal with an equal amount of Vinsol. The latter material fuses to a very mobile liquid at the temperature of the rolls, and forms a liquid film around the rolls and does not mix uniformly with the polyvinyl formal. It becomes especially difficult to blend such refractory polyvinyl formal with an amount of fused Vinsol sufficient to give the molding composition satisfactory hot flow properties. With the polyvinyl butyral resins this difficulty is generally not encountered, at least not to the same degree, and such resins can generally be compounded on the usual heated mixing rolls.

The oxidized abietic acid is available on the market under the trade name "Vinsol" and consists of a resinous residue made by a known process which comprises (1) extracting pine wood with a coal tar hydrocarbon, (2) evaporating the coal tar hydrocarbon and other volatile constituents of the extract from the extract to produce a solid residue, (3) extracting rosin from said residue with a light petroleum hydrocarbon, (4) separating the rosin extract from the remaining residue which is substantially insoluble in light petroleum hydrocarbons, and (5) recovering the remaining resinous residue.

Accordingly, one feature of the present invention involves a procedure whereby highly refractory high molecular weight polyvinyl acetal resins of the type of high molecular weight polyvinyl formal can be uniformly blended with even more than their own weight of Vinsol (or Vinsol plus other flux), the polyvinyl formal (or equivalent resin) being of the type which cannot be blended uniformly and homogeneously with its own weight of Vinsol within a half hour's treatment on heated compounding rolls. I have, however, found that these two materials can be uniformly and homogeneously mixed, along with the other components, if they are subjected, at an elevated temperature, to a vigorous masticating action which acts continuously to tear the polyvinyl formal particles while exposing them to the action of the fused Vinsol and other materials. By such masticating action, the tough, horny, difficultly fusible polyvinyl formal can be made to yield a uniform product with even considerably more than its own weight of Vinsol. A suitable mechanism for effecting the blending under vigorous mastication is that known as the Banbury mixer, which is operated with a suitable heating medium, such as steam, in its jackets. Another type is one which operates on the extrusion principle, the mixing being effected by one or more rotating screws.

I have found further that despite the brittle character of the Vinsol, there can be produced a molding composition of exceptional strength and having desirable molding properties when the same is compounded with a refractory polyvinyl acetal resin of any of the specific types above referred to. A product of high strength is obtained even where the Vinsol is present in an amount substantially equal to or even greater than that of the polyvinyl acetal resin. So great is the strength of the molding material that after suitable additions are made thereto, 16-inch sound records can be molded therewith which are only about 40 mils in thickness and which are nevertheless able easily to withstand the usual shocks and other stresses of transportation and use, and which are remarkably free from cold flow and any tendency to warp.

It will be seen from the foregoing that the two primary components of my composition, namely, the high molecular weight, tough resin and the Vinsol (with or without additional flux) each possesses properties which are undesirable in a molding composition, especially one to be used for the manufacture of sound records. Thus, as already indicated, the high molecular weight polyvinyl formal, acetal and butyral are generally of non-molding character, or are extremely difficult to mold, as they do not have the necessary flow and plasticity, which is true also of the other tough, refractory resins falling within the scope of my invention, such as certain other polyvinyl resins; while the Vinsol, aside from being of relatively low softening point, is brittle and is thus seemingly unsuited for the manufacture of strong, molded articles. Whereas heretofore it was the usual practice to compound a molding composition by using as a base or major component a resin having the requisite flow and plasticity characteristics, neither of the major components of my composition can be considered to be a good molding resin. Yet I have found that when these materials are properly blended an excellent molding material having the desirable properties above described can be obtained.

The refractory nature of the polyvinyl acetals varies with the type (polyvinyl formal, acetal, etc.) and with the viscosity of the original polyvinyl ester resin and with the extent of the hydrolysis of such resin prior to the acetalization. The polyvinyl acetals are usually characterized in the industry by two numbers, the first number indicating the viscosity of the original polyvinyl acetate resin, and the second number representing the degree of the hydrolysis of such resin prior to the reaction with the aldehyde. The viscosity value is usually referred to as the "viscosity number" or "Gelva number." Thus a polyvinyl formal 15–95 is one prepared by reacting formaldehyde with the product obtained by hydrolyzing, to the extent of 95%, a polyvinyl acetate resin having a viscosity of 15 centipoises when measured at 20° C. in a benzene solution containing 86 grams of the polyvinyl acetate per liter. As will be readily understood, the lower polyvinyl acetate numbers refer to the less tough resins, while the higher polyvinyl acetate numbers indicate harder and tougher resins. The hydrolysis number represents, as is known, the mole per cent of acetyl radicals removed from the polyvinyl acetate resin by the hydrolysis and is determined in known manner.

As the acetaldehyde polyvinyl acetals, butyrals, and other polyvinyl acetal resins made with aldehydes of higher molecular weights than formaldehyde are less refractory than a corresponding polyvinyl formal prepared from the same polyvinyl acetate resin, the acetaldehyde polyvinyl acetals, butyrals, etc. corresponding to a given polyvinyl formal, will have a higher polyvinyl acetate number or a higher hydrolysis number, and generally both. For this reason no single range of polyvinyl acetate numbers and/or hydrolysis numbers will apply to all types of polyvinyl acetal resins, since the ranges of these values for the refractory resins of each type will be different; and for this reason I have referred to hard, tough, high softening point and generally difficultly workable resins of these different types, as refractory resins. I may, however, state that in the case of the polyvinyl formals, the refractory resins will have a polyvinyl acetate number of at least 7, and a hydrolysis number of at least 80%. A polyvinyl acetate number of 7 corresponds roughly to an original polyvinyl acetate resin having a molecular weight of approximately 11,700, while the polyvinyl formal resin of such polyvinyl acetate number and hydrolysis number of 80 will have a molecular weight of, roughly, 7,000. The refractoriness of the polyvinyl acetal resin will increase with increase of one or both of the polyvinyl acetate and hydrolysis numbers. In the case of the acetaldehyde polyvinyl acetals, the resins become rather refractory when the polyvinyl acetate number is at least about 15, while with polyvinyl butyrals, the polyvinyl acetate number begins at about 25; in both cases the hydrolysis number is at least 80. In the preferred forms of the invention, the hydrolysis number is at least 90%. With other polyvinyl acetal resins, the minimum polyvinyl acetate number will differ correspondingly, but I regard all these resins as falling within the scope of the present invention where they have a hydrolysis number of at least 80%, and they are prepared from a polyvinyl acetate having such a viscosity that the final resin is of refractory character and generally unsuited for ordinary molding operations.

It is known that polyvinyl acetate resins (polyvinyl acetates) of the same viscosities but prepared by different procedures, may nevertheless yield polyvinyl acetal resins of different viscosities or degrees of toughness, even though all other factors such as degree of hydrolysis, the nature of the aldehyde, etc. are the same. Thus polyvinyl acetates prepared in benzene solution and having the same viscosity as one prepared in toluene solution, or by any other process such as the suspension process, and hydrolyzed to the same degree, will, on treatment in similar fashion with an aldehyde, produce polyvinyl acetal resins of different viscosities. For the sake of simplicity, the polyvinyl acetates will be assumed in the present specification and in the subjoined claims to have been prepared in a benzene solution, and the polyvinyl acetate numbers will refer to the viscosity of polyvinyl acetates so prepared, and the hydrolysis numbers are to be understood as referring to the degree of hydrolysis of such polyvinyl acetates. It is accordingly to be understood that where I make reference to a polyvinyl acetate of a certain viscosity, the same is to be understood as embracing also polyvinyl acetates made in other solvents than benzene or by other procedures, and having an equivalent viscosity, that is, yielding acetal resins of substantially the same viscosity as that made from the benzene-prepared polyvinyl acetate on hydrolysis to the same degree and treatment with the same aldehyde. Those polyvinyl acetate resins prepared by other procedures are accordingly to be regarded as equivalents of the herein specified polyvinyl acetates where on similar hydrolysis and treatment with aldehyde they yield polyvinyl acetal resins of substantially the same order of hardness and toughness.

I have found further that a uniform blend of a refractory polyvinyl acetal resin and Vinsol is compatible with various plasticizers and also with other fluxes, for example, yacca resin. Excellent molding compositions can be obtained by combining the polyvinyl acetal resin with Vinsol, yacca and a plasticizer, the yacca acting to counterbalance and eliminate form instability which is generally imparted by the plasticizer.

The preferred types of polyvinyl formals are those having a polyvinyl acetate number of about 10–30 and a hydrolysis number of about 90–100. With the acetaldehyde polyvinyl acetals, the preferred polyvinyl acetate numbers are from about 25–60, while the hydrolysis numbers are about 90–100. In the case of the polyvinyl butyrals, the preferred polyvinyl acetate number range is from about 40–100, while the hydrolysis number is above 95. For the manufacture of sound recordings, a polyvinyl formal having a polyvinyl acetate number of 15 and a hydrolysis number of 95, has proved to be highly satisfactory.

The amount of Vinsol required in any particular composition will depend upon the specific polyvinyl acetal resin employed. Thus less Vinsol (with or without other fluxing material) will be needed for a polyvinyl acetal resin of a lower polyvinyl acetate number than for one made from a polyvinyl acetate resin having a higher polyvinyl acetate number. In general, the amount of Vinsol will vary directly with the refractoriness of the polyvinyl acetal resin, and will depend also on whether the composition is filled or not, less Vinsol being needed for the unfilled compositions. Satisfactory proportions of flux and plasticizing agents with different types of polyvinyl acetal resins and for different uses will be indicated below, but it may be stated at this point that the optimum proportions for any type of high molecular weight resin can be readily determined by simple experimentation, having the object in view that satisfactory flow, plasticity and other molding qualities are secured at the molding temperatures without unfavorably affecting the strength, form stability and other properties required at room temperatures. In general, enough Vinsol, or Vinsol plus other fluxing material, should be employed to give the mixture a satisfactory flow at the molding temperatures.

I prefer to use about 25–125 parts of Vinsol (by weight) for each 100 parts of the polyvinyl acetal resin, if desired, along with a suitable plasticizer and an additional flux. For the manufacture of sound records, the proportions can be so selected as to provide sufficient flow at a standard phonograph record press cycle of, for example, about 74 seconds, which is composed of the following periods:

22 seconds to heat die as it lifts;
22 seconds for maintaining stock under heat and pressure within the die;
30 seconds for chilling.

A minor proportion of the Vinsol may be replaced with another fluxing agent like a cumarone resin; while when considerable amounts of plasticizer are used, an addition of yacca, even up to an amount of the order of the Vinsol, can be employed to overcome the unfavorable influence of the plasticizer on the form stability. The yacca, however, is not added, nor is it needed, to improve the form stability of the refractory polyvinyl acetal resin.

For producing lighter-colored transparent compositions, as for making transparent phonograph records, it is desirable to replace a part of the Vinsol with suitable less highly colored resin, like a resin of the cumarone or cumarone-indene type, yacca, etc. Compositions of intermediate degree of transparency can, of course, be produced by suitably varying the proportions of Vinsol and other fluxing resins and the content of the filler. Plasticizers may be, and in the case of the more refractory resins preferably are, employed in conjunction with the Vinsol or Vinsol plus cumarone or other resin.

My investigations have shown that molding compositions containing polyvinyl acetal resins, particularly the more refractory resins of this type, and fluxed with Vinsol, are very materially improved by the presence of one or more metal soaps, preferably of the higher saturated fatty acids, like the stearates. I have found that the lead, aluminum, calcium, zinc and lithium soaps are particularly desirable because they do not materially affect the impact strength and form-stability of a molded article containing the binder of the present invention, such soaps being used individually, or a number of them in admixture. Especially with the tougher types of polyvinyl acetal resins, these soaps act to facilitate greatly the cutting of the "flash" material from the molded product, that is, the excess material clinging to the molded article. The advantageous effects of the soaps from the standpoint of flash cutting are generally not very marked when they are employed in an amount up to about 2½ or 3% of the weight of the resin, but definite improvement is noted when the proportion is raised to about 5% and generally becomes more marked when the soap content is raised to about 7%. Larger amounts than 7% can be employed, even up to 15%, without seriously affecting the other properties of the composition. The impact strength shows no falling off when the soap content is about 7% and in an unfilled record composition good results are obtained when the soap content is 12% based on the polyvinyl acetal resin.

I have found further that lithium stearate even when used in relatively large amounts, say 7–12%, tends to increase the form stability, as in a phonograph record made therewith, instead of lowering the form stability as would normally be expected and as is the case with many of the more common metal stearates. This improved result may be due to the higher alkalinity of lithium stearate and is to some extent characteristic also of the other alkali metal stearates, and also of their other soaps, and especially of the higher molecular weight alkali metals, like caseium and rhubidium.

The metal soap acts also as a lubricating or parting agent in addition to facilitating flash cutting, but, if desired, it may be replaced by or used together with another lubricating material like carnauba wax, ceranova wax, and beta-chloronaphthalene, which is available on the market under the name "Halowax." The total amount of lubricant may be 10–25 parts for 100 parts of the polyvinyl acetal resin, the higher proportions being generally preferred. Of this, 3–15 parts may be constituted of the metal soap, as stated hereinabove. The carnauba wax may range in amount from about 0.2 to 4.5% of the acetal resin, and approximately similar proportions apply to the ceranova wax. The beta-chloronaphthalene may be used in somewhat larger amounts, say 3–8%.

Where a cumarone resin is used, the grades known as V to MH are preferred, the V grade being the hardest. The lower grade tends to give a somewhat more flexible product. The amount of the resin may vary from two to twenty parts per 100 parts of the acetal resin, the preferred range being 2½ to 12 parts.

My composition may include a suitable softening and binding agent, such as a mixture of coal tar hydrocarbons of softening point 205°–220° F., for example that sold under the name of "Carbonex." This is a mixture of coal tar pitch and gas house pitch having a softening point of 205–220° F. by the ring and ball method in glycerine and contains 40–44% insolubles in benzene. This material may be present in an amount up to 15% of the refractory resin, a preferred maximum being about 13%. A pigment in the form of a fine, soft carbon black may also be incorporated in the molding composition, in an amount up to about 15% of the weight of the resin. A product composed of channel carbon black in bead form and has been found by me to give satisfactory results.

Where fillers are to be employed the total amount may reach 250 parts for each 100 parts of the acetal resin, about 100 parts being generally preferred. It is best to employ materials of very fine particle size so as to reduce the surface noises. Suitable materials are forms of calcium carbonate of 325 mesh, or finer, such as that sold under the names "Lesomite," and "Atomite", and diatomaceous earths, like, "Superfloss", and "Celite" and "Dicalite".

The amount of plasticizers may range from zero up to about 40 parts, preferably 5 to 30 parts for each 100 parts of resin. Among the materials that can be used are methyl phthalyl ethyl glycollate, ortho-nitro-diphenyl, dibutyl phthalate, dibutyl sebacate, and dimethoxy ethyl phthalate, available under the brand name "Methox".

The following formulas represent satisfactory compositions in accordance with the invention but are not to be understood as indicating the limits thereof:

Example 1

| | Parts |
|---|---|
| Formvar 15–95 | 100 |
| Vinsol | 67 |
| Para-cumarone-indene resin V3 or MH | 3 |
| Carnauba wax | 2¼ |
| Aluminum stearate | 2½ |
| Lead stearate | 4¼ |
| Halowax 1013 | 7 |
| Carbonex | 8½ |
| Ortho-nitro-diphenyl | 7 |
| Carbon black | 8½ |
| Lesomite | 93 |

A phonograph record press cycle of about 74 seconds can be used to mold either single or double face records from this composition. These records are characterized by excellent wear, low surface noise level, and good fidelity coupled with excellent strength and form stability. Rigid type records can be molded from this composition with a thickness of below 40 mils. It can also be used as a facing on either rigid or flexible type laminated records.

In the compounding of the above formula, all of the ingredients may be preliminarily mixed in any suitable mixer at room temperature except that the solid plasticizer may, if desired, first be fused, the polyvinyl formal being preferably used in the form of small granules not coarser than 12-mesh. The mixture is then charged into a Banbury mixer which is then operated at a temperature of about 320° F. for about 10–15 minutes, or until the mixture is uniform. The uniform mixture is then dropped on to blanking rolls where it is sheeted and the sheet is thereafter cut into "biscuits" while still hot. In place of the Banbury mixer, a suitable type of extruder form of mixer may be used. This procedure may be employed also in compounding the formulae of Examples 2–6 except that in the case of the polyvinyl butyral compositions, which blend more easily with Vinsol, the mixing may be carried out on the conventional heated compounding rolls.

Example 2

| | Parts |
|---|---|
| Formvar 15–95 | 100 |
| Vinsol | 25 |
| Yacca gum | 25 |
| Carnauba wax | 1 |
| Ceranova | 1 |
| Lead stearate | 5 |
| Ortho-nitro diphenyl | 30 |

This is an example of a composition for producing an unfilled flexible type record possessing similar characteristics to the composition of Example 1 and in addition possessing adequate flexibility.

In this composition a portion of the Vinsol has been replaced by pacca and the plasticizer has been adjusted, to give satisfactory flow properties. "Halowax" (beta-chloronaphthalene) up to about 5 parts can be used to replace a portion of the plasticizer.

Example 3

| | Parts |
|---|---|
| Butvar 55–98 | 100 |
| Vinsol | 67 |
| Cumar V3 | 3 |
| Carnauba wax | 2¼ |
| Aluminum stearate | 2½ |
| Lead stearate | 5 |
| Halowax 1013 | 7 |
| Carbon black | 8 |
| Lesomite | 93 |

This composition is suitable for producing filled rigid type records possessing characteristics similar to that of Example 1 except that the molding cycle is about 20 seconds longer. Increasing the Vinsol to 80 parts or the addition of 4 parts of plasticizer will adjust the molding cycle to about 74 seconds.

Example 4

| | Parts |
|---|---|
| Butvar 25–98 | 100 |
| Vinsol | 40 |
| Para-cumarone indene resin V3 | 3 |
| Carnauba wax | 2¼ |
| Aluminum stearate | 2½ |
| Pb stearate | 5 |
| Halowax 1013 | 7 |
| Carbon black | 8 |
| Lesomite | 93 |

This is an example of a composition suitable for producing filled rigid type records possessing characteristics similar to that of the previous example in which certain changes in formulation have been made to take care of differences in the refractory nature of the polyvinyl acetal resin used.

Example 5

| | Parts |
|---|---|
| Butvar 55–98 | 100 |
| Vinsol | 25 |
| Yacca | 25 |
| Carnauba wax | 1 |
| Ceranova wax | 1 |
| Halowax 1013 | 5 |
| Lead stearate | 5 |

This molding composition is suitable for producing unfilled flexible type records possessing characteristics similar to the composition of Example 2.

Example 6

| | Parts |
|---|---|
| Butvar 55–98 | 100 |
| Vinsol | 25 |
| Yacca gum | 25 |
| Carnauba wax | 1 |
| Ceranova wax | 1 |
| Halowax 1013 | 5 |
| Lithium stearate | 5 |

This example is similar to Example 5 except that the lead stearate is replaced by lithium stearate which gives an increased form stability to the extent of about 5° C.

The molding compositions prepared with the polyvinyl acetal resins are of considerably lower density than those prepared, for example, with shellac or "Vinylite" (a co-polymer of vinyl acetate and vinyl chloride), because of the relatively low density of the acetal resins. Thus, for example, polyvinyl butyral has a density of about 1.10, polyvinyl acetal of about 1.17, and polyvinyl formal of about 1.22. Phonograph records and other articles manufactured with, for example, the polyvinyl acetal resin, are consequently of lower weight than those made with shellac or Vinylite, and this weight advantage is of the order of 20–30% or more in comparison with records made from other resins.

Because of the unusual strength and stiffness of the molded discs manufactured with the refractory polyvinyl acetal resins, considerably thinner phonograph records can be manufactured from my improved molding compositions such as those hereinabove set out than those now regularly produced. Thus records having a thickness of about 40 mils or less instead of the usual 90 mils, are entirely practical. Such records, despite their thinness, have adequate strength to resist shock and impact, including the impact of the tone-arm and needle in automatic phonographs. For automatic machines which are designed for use with records of standard thickness, a record made with the compositions of the present invention may be provided with a circular central region and a peripheral region of the usual thickness, while the intermediate annular section may have a thickness of the order of about 40 mils, the three different areas being united by appropriately inclined sections.

It will be seen from the foregoing that I have provided a uniform and homogeneous molding composition of good flowing properties when hot but of a highly satisfactory degree of form stability when cold and of high impact and tensile strength, combined with good surface qualities in a phonograph record, from highly refractory polyvinyl acetal resins, and have thereby made it possible to employ these relatively expensive resins to produce relatively cheap molding compositions. So far as I am aware, I am the first to utilize these refractory acetal resins, which cost no more than the lower viscosity resins having the desired hot flow properties, but which are much stronger and tougher than the lower viscosity resins, in a molding composition for the heat and pressure molding of phonograph records. Whereas it has been the practice generally in the art of molding, and particularly in the art of molding phonograph records, to use a resin binder which itself has adequate flow properties at the molding temperature, the composition of the present invention embodies a non-flowing resin which by an inexpensive addition (Vinsol) has imparted thereto satisfactory fluidity at the molding temperatures. In consequence, the usual biscuit of small diameter can be employed and during the molding will flow readily to the periphery of the phonograph record mold. The highly satisfactroy results obtained with the brittle Vinsol are all the more surprising in view of the fact that tests have shown that phenol-formaldehyde resins, including those modified with rosin, and Manila Copal when compounded, for example, with Formvar, gave weak molded articles, while other materials reduced the softening point too greatly. Phonograph records made with my improved compositions have a higher softening point than the known shellac records, and at the same time a higher strength, while possessing equally good hot flow properties.

It will also be noted that the refractory polyvinyl acetal resins are made easily flowing at molding temperatures without the aid of relatively large amounts of plasticizers. The use of large amounts of plasticizers is generally undesirable as they reduce seriously the form stability and considerably increase warp. Highly plasticized molded articles also tend to become "unmolded," that is, fine edges and crevices tend to be destroyed or become obliterated. In the compositions of the present invention the Vinsol, with or without cumerone, yacca and other additions provides sufficient fluidity at molding temperature so as to make the use of relatively large amounts of plasticizer unnecessary.

I claim:

1. A heat and pressure-moldable composition suitable for the manufacture of heat and pressure-molded phonograph records, and comprising a uniform mixture of (1) a tough and horny polyvinyl acetal resin obtained from a polyvinyl acetate of a viscosity of at least 7 centipoises (measured at 20° C. in a benzene solution containing 86 grams of the polyvinyl acetate per liter) and hydrolyzed to the extent of at least 80%, followed by reaction with an aldehyde, (2) about 25% to 125% by weight, based on the weight of said resin, of a petroleum hydrocarbon-insoluble, aromatic hydrocarbon-soluble, resinous pine wood extract, (3) about 2½ to 15%, based on the weight of the acetal resin, of a metal soap, and (4) a small proportion of wax, said acetal resin having a higher softening point than said pine wood extract and such softening point being reduced by the pine wood extract.

2. A composition as defined in claim 1 wherein the acetal resin is a polyvinyl formal resin.

3. A composition as defined in claim 1 wherein the acetal resin is a polyvinyl formal resin obtained from a polyvinyl acetate of a viscosity of about 15 centipoises and hydrolyzed to the extent of about 95%.

4. A composition as defined in claim 1 wherein the acetal resin is an acetaldehyde polyvinyl acetal resin obtained from a polyvinyl acetate having a viscosity of at least 25 centipoises and hydrolyzed to the extent of at least 90%.

5. A composition as defined in claim 1 wherein the metal soap is lithium stearate.

6. A heat and pressure-moldable composition suitable for the manufacture of heat and pressure-molded phonograph records, and comprising a uniform mixture of a tough and horny polyvinyl acetal resin obtained from a polyvinyl acetate of a viscosity of at least 7 centipoises (measured at 20° C. in a benzene solution containing 86 grams of the polyvinyl acetate per liter) and hydrolyzed to the extent of at least 80%, followed by reaction with an aldehyde, about 25% to 125%, based on the weight of said resin, of a petroleum hydrocarbon-insoluble, aromatic hydrocarbon-soluble, resinous pine wood extract, said acetal resin having a higher softening point than the pine wood extract, and a quantity of an inorganic filler at least about equal to the weight of the acetal resin.

7. A composition as defined in claim 1, including approximately 5 to 30 parts of a plasticizer based on the weight of the acetal resin, and yacca gum in an amount sufficient to form-stabilize the composition.

8. A composition as defined in claim 6, wherein the acetal resin is a polyvinyl formal resin obtained from a polyvinyl acetate of a viscosity of about 15 centipoises and hydrolyzed to the extent of about 95%.

9. A composition as defined in claim 6, wherein the acetal resin is an acetaldehyde polyvinyl acetal resin obtained from a polyvinyl acetate having a viscosity of at least 25 centipoises and hydrolyzed to the extent of at least 90%.

10. A composition as defined in claim 6, including a parting agent, in the form of lithium stearate.

11. A heat and pressure-molded phonograph record having the sound groove molded therein and prepared from a composition as defined in claim 1.

12. A heat and pressure-molded phonograph record having the sound groove molded therein and prepared from a composition as defined in claim 3.

13. A heat and pressure-molded phonograph record having the sound groove molded therein and prepared from a composition as defined in claim 6.

14. A heat and pressure-molded phonograph record having the sound groove molded therein and prepared from a composition as defined in claim 8.

GEORGE F. METZ.

REFERENCES CITED

The following references are of record in the file of this patent:

UNITED STATES PATENTS

| Number | Name | Date |
|---|---|---|
| 1,083,168 | Whipple | Dec. 30, 1913 |
| 1,956,837 | Schmidt | May 1, 1934 |
| 2,062,815 | Matheson | Dec. 1, 1936 |
| 2,114,393 | Lane | Apr. 19, 1938 |
| 2,116,986 | Stose | May 10, 1938 |
| 2,130,239 | Hunter | Sept. 13, 1938 |
| 2,193,026 | Hall | Mar. 12, 1940 |
| 2,527,497 | Hunt | Oct. 24, 1950 |

FOREIGN PATENTS

| Number | Country | Date |
|---|---|---|
| 414,703 | Great Britain | Aug. 8, 1934 |

OTHER REFERENCES

Skirrow: Chemistry and Industry, November 26, 1938, pp. 1117–1119.

Synthetic and Applied Finishes, June 1935, pp. 61 and 62.

E. I. du Pont de Nemours Technical Data Bulletin 4-2-43, pg. 1.

Wakeman: The Chemistry of Commercial Plastics, Reinhold 1947, pp. 376 to 381.